United States Patent
Fletcher

(10) Patent No.: US 10,316,689 B2
(45) Date of Patent: Jun. 11, 2019

(54) GAS TURBINE ENGINE HEALTH MONITORING SYSTEM WITH SHAFT-TWIST SENSORS

(71) Applicant: Rolls-Royce Corporation, Indianapolis, IN (US)

(72) Inventor: William S. Fletcher, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 252 days.

(21) Appl. No.: 15/243,107

(22) Filed: Aug. 22, 2016

(65) Prior Publication Data

US 2018/0051587 A1   Feb. 22, 2018

(51) Int. Cl.
| | |
|---|---|
| *F01D 21/00* | (2006.01) |
| *F01D 17/06* | (2006.01) |
| *F01D 21/04* | (2006.01) |
| *F01D 5/02* | (2006.01) |
| *F04D 25/04* | (2006.01) |

(Continued)

(52) U.S. Cl.
CPC ............ *F01D 21/003* (2013.01); *F01D 5/02* (2013.01); *F02C 3/00* (2013.01); *F02K 3/00* (2013.01); *F04D 25/045* (2013.01); *F04D 27/001* (2013.01); *F04D 29/053* (2013.01); *G01H 1/10* (2013.01); *G01M 15/14* (2013.01); *F05D 2220/32* (2013.01); *F05D 2240/60* (2013.01); *F05D 2260/80* (2013.01); *F05D 2260/821* (2013.01); *F05D 2260/83* (2013.01)

(58) Field of Classification Search
None
See application file for complete search history.

(56) References Cited

U.S. PATENT DOCUMENTS

| | | | |
|---|---|---|---|
| 2,930,188 | A | 3/1960 | Lionel et al. |
| 2,930,189 | A | 3/1960 | Alexander |

(Continued)

FOREIGN PATENT DOCUMENTS

| | | |
|---|---|---|
| DE | 19547751 A1 | 6/1997 |
| DE | 102009016105 A1 | 8/2010 |

(Continued)

OTHER PUBLICATIONS

Extended European Search Report, European Application No. 17182790.0-1007, dated Jan. 12, 2018, 6 pages.

*Primary Examiner* — Leslie J Evanisko
*Assistant Examiner* — Ruben C Parco, Jr.
(74) *Attorney, Agent, or Firm* — Barnes & Thornburg LLP

(57) ABSTRACT

A controller for a gas turbine engine is disclosed. The controller is configured to measure a first rotational speed of a shaft of the engine at a first end of the shaft and to measure a second rotational speed of the shaft at a second end. The first end may be coupled to a turbine of the engine and the second end may be coupled to a compressor of the engine. The controller is further configured to determine a shaft twist angle as a function of the first rotational speed and the second rotational speed, determine whether the shaft twist angle is within a predetermined shaft health monitoring range, and record the shaft twist angle. The controller may be configured to generate a maintenance alert in response to determining that the shaft twist angle is within the predetermined shaft health monitoring range.

17 Claims, 3 Drawing Sheets

(51) Int. Cl.
*F04D 27/00* (2006.01)
*F04D 29/053* (2006.01)
*G01M 15/14* (2006.01)
*F02K 3/00* (2006.01)
*F02C 3/00* (2006.01)
*G01H 1/10* (2006.01)

(56) References Cited

U.S. PATENT DOCUMENTS

| | | | |
|---|---|---|---|
| 4,310,768 A | 1/1982 | Colley | |
| 4,505,104 A | 3/1985 | Simmons | |
| 4,987,737 A | 1/1991 | Cantwell | |
| 5,067,355 A * | 11/1991 | Witte | G01L 3/109 |
| | | | 73/112.01 |
| 6,494,046 B1 | 12/2002 | Hayess | |
| 6,668,629 B1 * | 12/2003 | Leslie | H02J 9/066 |
| | | | 73/114.01 |
| 6,827,548 B2 | 12/2004 | Coxhead et al. | |
| 7,002,172 B2 | 2/2006 | Rensch | |
| 7,100,354 B2 | 9/2006 | Opper | |
| 7,818,970 B2 | 10/2010 | Price et al. | |
| 8,159,081 B2 | 4/2012 | Gainford et al. | |
| 8,568,087 B2 | 10/2013 | McIntosh et al. | |
| 8,943,876 B2 | 2/2015 | Rowe et al. | |
| 2009/0320609 A1 | 12/2009 | Xia et al. | |
| 2013/0133333 A1 | 5/2013 | Bacic | |
| 2013/0152600 A1 | 6/2013 | Rowe | |
| 2013/0319092 A1 * | 12/2013 | Rowe | F01D 21/003 |
| | | | 73/112.01 |
| 2015/0107342 A1 | 4/2015 | Jensen et al. | |
| 2015/0168264 A1 | 6/2015 | Proctor | |
| 2016/0010494 A1 | 1/2016 | Erlund et al. | |

FOREIGN PATENT DOCUMENTS

| | | |
|---|---|---|
| EP | 103370 A1 | 3/1984 |
| EP | 2006651 A2 | 12/2008 |
| GB | 681601 A | 10/1952 |
| GB | 735874 A | 8/1955 |
| GB | 735913 A | 8/1955 |
| GB | 740090 A | 11/1955 |
| GB | 772247 A | 4/1957 |
| GB | 777423 A | 6/1957 |
| GB | 849131 A | 9/1960 |
| GB | 862334 A | 3/1961 |
| GB | 884552 A | 12/1961 |
| GB | 911049 A | 11/1962 |
| GB | 956855 A | 4/1964 |
| GB | 1172126 A | 11/1969 |
| GB | 1282400 A | 7/1972 |
| GB | 2084190 A | 4/1982 |
| GB | 2111639 A | 7/1983 |
| GB | 2084190 B | 8/1983 |
| GB | 2114266 A | 8/1983 |
| GB | 2377731 A | 1/2003 |
| JP | 2007093407 A * | 4/2007 |

* cited by examiner

GAS TURBINE ENGINE HEALTH MONITORING SYSTEM WITH SHAFT-TWIST SENSORS

FIELD OF THE DISCLOSURE

The present disclosure relates generally to gas turbine engines, and more specifically to technology for monitoring and controlling gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Mechanical power is transferred from turbines to compressors through shaft and spline systems, with bearings providing axial and radial positioning of the rotating components. A central shaft (which may be referred to as a "main" shaft, a "main drive," or a "mainline" shaft, for example) typically links the turbine and compressor sections of the turbine engine. In turbine engines having multiple turbine and compressor sections, there may be multiple, concentric, independently rotatable shafts. For example, a high-pressure shaft may link a high-pressure compressor with a high-pressure turbine, while a low-pressure shaft links the fan with a low-pressure turbine. The low-pressure shaft may be concentric with and disposed within the high-pressure shaft. Certain maintenance procedures may require inspecting and verifying the condition of one or more shafts, which may require taking the engine of service and disassembling the engine.

SUMMARY

The present disclosure may comprise one or more of the following features and combinations thereof.

A controller for gas turbine engine health monitoring may include shaft twist monitoring logic configured to measure a first rotational speed of a shaft of a gas turbine engine at a first end of the shaft, wherein the first end of the shaft is coupled to a turbine of the gas turbine engine; measure a second rotational speed of the shaft at a second end of the shaft, wherein the second end of the shaft is coupled to a compressor of the gas turbine engine; determine a shaft twist angle of the shaft as a function of the first rotational speed and the second rotational speed; determine whether the shaft twist angle is within a predetermined shaft health monitoring range; and record the shaft twist angle in response to a determination whether the shaft twist angle is within the predetermined shaft health monitoring range. In some embodiments, the shaft twist monitoring logic may be further configured to generate a maintenance alert in response to a determination that the shaft twist angle is within the predetermined shaft health monitoring range. In some embodiments, the gas turbine engine may include a multi-shaft turbine engine, and the shaft may be concentrically positioned within a second shaft.

In some embodiments, to determine whether the shaft twist angle is within the shaft health monitoring range may include to determine whether the shaft twist angle has a first predetermined relationship to a predetermined maximum in-service twist angle; and determine whether the shaft twist angle has a second predetermined relationship to a predetermined minimum shaft breakage twist angle. In some embodiments, the first predetermined relationship may include is greater than and the second predetermined relationship may include is less than.

In some embodiments, to measure the first rotational speed may include to receive a first speed signal from a first speed sensor of the gas turbine engine; and to measure the second rotational speed may include to receive a second speed signal from a second speed sensor of the gas turbine engine. In some embodiments, to determine the shaft twist angle may include to determine a phase difference between the first speed signal and the second speed signal.

According to another aspect of the present disclosure, a method for gas turbine engine health monitoring may include measuring, by a controller of a gas turbine engine, a first rotational speed of a shaft of the gas turbine engine at a first end of the shaft, wherein the first end of the shaft is coupled to a turbine of the gas turbine engine; measuring, by the controller, a second rotational speed of the shaft at a second end of the shaft, wherein the second end of the shaft is coupled to a compressor of the gas turbine engine; determining, by the controller, a shaft twist angle of the shaft as a function of the first rotational speed and the second rotational speed; determining, by the controller, whether the shaft twist angle is within a predetermined shaft health monitoring range; and recording, by the controller, the shaft twist angle in response to determining whether the shaft twist angle is within the predetermined shaft health monitoring range. In some embodiments, the method may further include generating, by the controller, a maintenance alert in response to determining that the shaft twist angle is within the predetermined shaft health monitoring range.

In some embodiments, determining whether the shaft twist angle is within the shaft health monitoring range may include determining whether the shaft twist angle has a first predetermined relationship to a predetermined maximum in-service twist angle; and determining whether the shaft twist angle has a second predetermined relationship to a predetermined minimum shaft breakage twist angle. In some embodiments, determining whether the shaft twist angle has the first predetermined relationship to the predetermined maximum in-service twist angle may include determining whether the shaft twist angle is greater than the maximum in-service twist angle; and determining whether the shaft twist angle has the second predetermined relationship to the predetermined minimum shaft breakage twist angle may include determining whether the shaft twist angle is less than the minimum shaft breakage twist angle.

In some embodiments, measuring the first rotational speed may include receiving a first speed signal from a first speed sensor of the gas turbine engine; and measuring the second rotational speed may include receiving a second speed signal from a second speed sensor of the gas turbine engine. In some embodiments, determining the shaft twist angle may include determining a phase difference between the first speed signal and the second speed signal.

According to another aspect of the present disclosure, one or more computer-readable storage media may include a plurality of instructions that in response to being executed cause a controller of a gas turbine engine to measure a first rotational speed of a shaft of the gas turbine engine at a first end of the shaft, wherein the first end of the shaft is coupled to a turbine of the gas turbine engine; measure a second rotational speed of the shaft at a second end of the shaft, wherein the second end of the shaft is coupled to a compressor of the gas turbine engine; determine a shaft twist angle of the shaft as a function of the first rotational speed and the second rotational speed; determine whether the shaft twist angle is within a predetermined shaft health monitoring range; and record the shaft twist angle in response to determining whether the shaft twist angle is within the predetermined shaft health monitoring range. In some embodiments, the one or more computer-readable storage media may further include a plurality of instructions that in response to being executed cause the controller to generate a maintenance alert in response to determining that the shaft twist angle is within the predetermined shaft health monitoring range. In some embodiments, the gas turbine engine may include a multi-shaft turbine engine and the shaft may be concentrically positioned within a second shaft.

In some embodiments, to determine whether the shaft twist angle is within the shaft health monitoring range may include to determine whether the shaft twist angle has a first predetermined relationship to a predetermined maximum in-service twist angle; and determine whether the shaft twist angle has a second predetermined relationship to a predetermined minimum shaft breakage twist angle. In some embodiments, to determine whether the shaft twist angle has the first predetermined relationship to the predetermined maximum in-service twist angle may include to determine whether the shaft twist angle is greater than the maximum in-service twist angle; and to determine whether the shaft twist angle has the second predetermined relationship to the predetermined minimum shaft breakage twist angle may include to determine whether the shaft twist angle is less than the minimum shaft breakage twist angle.

In some embodiments, to measure the first rotational speed may include to receive a first speed signal from a first speed sensor of the gas turbine engine; and to measure the second rotational speed may include to receive a second speed signal from a second speed sensor of the gas turbine engine. In some embodiments, to determine the shaft twist angle may include to determine a phase difference between the first speed signal and the second speed signal.

These and other features of the present disclosure will become more apparent from the following description of the illustrative embodiments.

DETAILED DESCRIPTION OF THE DRAWINGS

Figure 1:
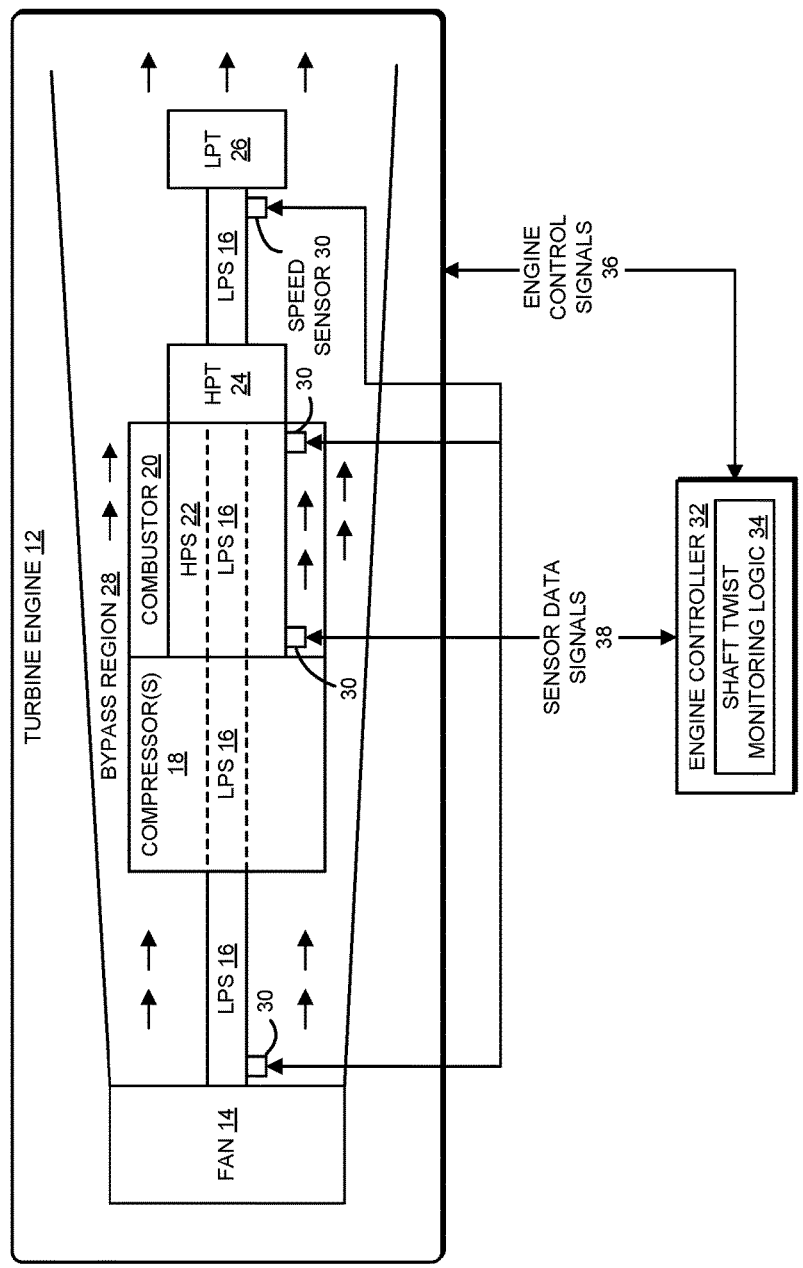
FIG. 1 is a simplified block diagram of at least one embodiment of a turbine engine system including engine health monitoring.

For the purposes of promoting an understanding of the principles of the disclosure, reference will now be made to a number of illustrative embodiments illustrated in the drawings and specific language will be used to describe the same.

Referring now to FIG. 1, embodiments of a turbine engine system 10 with engine health monitoring include a turbine engine 12 and an engine controller 32. In use, as described in further detail below, the engine controller 32 measures rotational speed at either end of one or shafts of the turbine engine 12. Based on the measured rotational speed, the engine controller 32 determines the twist angle of the corresponding shaft. The engine controller 32 monitors the shaft twist angle and may log shaft twist data and/or generate alerts if the shaft twist angle is within a predetermined shaft health monitoring range. During normal usage, an engine shaft may be expected to twist under load up to a certain predetermined twist angle. Measured shaft twist angles above that predetermined twist angle, within the shaft health monitoring range, are not expected to occur in-service. Thus, measuring a shaft twist angle in the shaft health monitoring range indicates that an anomaly has occurred, such as a thermal event affecting the strength or other material properties (e.g., torsional stiffness) of the shaft, or any other mechanical anomaly (e.g., loss of structural integrity due to cracking or clashing another shaft or static structure) affecting torsional stiffness of the shaft. Accordingly, the turbine engine system 10 may allow for continual monitoring of the mechanical integrity of the shafts of the turbine engine 12, without requiring the turbine engine 12 to be disassembled and/or removed from service.

The illustrative turbine engine 12 is a multi-shaft turbofan gas turbine engine configured for aerospace applications; however, aspects of the present disclosure are applicable to other types of turbine engines, including various types of turbofan and turboshaft systems, as well as turbine engines that are configured for other, non-aerospace types of applications. A fan 14 (e.g., a fan, variable pitch propeller, compressor, etc.) draws air into the turbine engine 12. In some embodiments, some of the air drawn into the turbine engine 12 by the fan 14 may bypass other engine components via a bypass region 28 (e.g., a bypass duct). The remaining air flows to one or more compressors 18. For instance, in some embodiments, a low-pressure compressor may increase the pressure of air received from the fan 14, and a high-pressure compressor may further increase the pressure of air received from the low-pressure compressor. In any event, the compressor(s) 18 increase the pressure of the drawn-in air and forward the higher-pressure air to a combustor 20.

In the combustor 20, the pressurized air is mixed with fuel (e.g., gas), which is supplied to the combustor 20 by a fuel supply, for example a fuel pump. Typically, a flow meter, flow control valve, fuel flow sensor, or similar device monitors and/or regulates the flow of fuel into the combustor 20. An igniter (not shown) is typically used to cause the mixture of air and fuel to combust. The high-energy combusted air is directed to one or more turbines 24, 26. In the illustrative embodiment, a high-pressure turbine 24 is disposed in axial flow series with a low-pressure turbine 26. The combusted air expands through the turbines 24, 26, causing the turbines 24, 26 to rotate. The combusted air is then exhausted through, for example, a propulsion nozzle (not shown), which may generate additional propulsion thrust.

The rotation of the turbines 24, 26 causes the engine shafts 16, 22 to rotate. More specifically, rotation of the low-pressure turbine 26 drives a low-pressure shaft 16, which drives the fan 14. Rotation of the high-pressure turbine 24 drives the high-pressure shaft 22, which drives the compressor(s) 18. In the illustrative embodiments, the shafts 16, 22 are concentrically disposed and independently rotatable. In other embodiments, the shafts 16, 22 may be parallel but not concentric. Further, a single shaft, or more than two engine shafts, may be provided in other embodiments. For example, as shown in FIG. 2, an intermediate shaft may be disposed concentrically between the low-pressure shaft 16 and the high-pressure shaft 22 to support an intermediate-pressure compressor and turbine.

Figure 2:
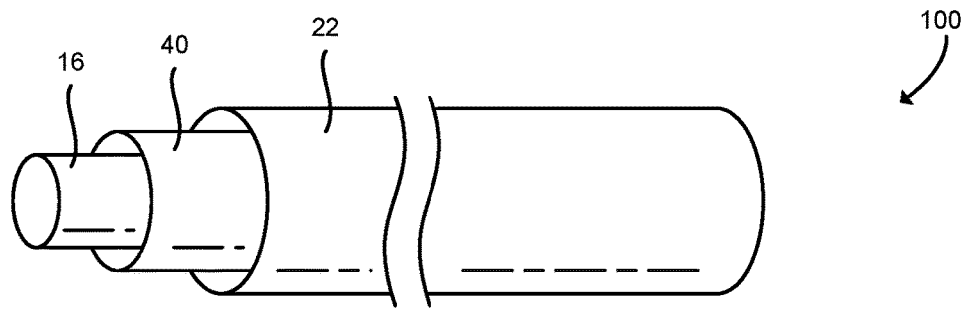
FIG. 2 is a simplified schematic diagram illustrating a coaxial arrangement of shafts of the turbine engine system of FIG. 1.

Referring now to FIG. 2, diagram 100 illustrates one potential embodiment of a coaxial arrangement of three shafts. As shown, the low-pressure shaft 16 is positioned coaxially within an intermediate-pressure shaft 40, and the intermediate-pressure shaft 40 is positioned coaxially between the low-pressure shaft 16 and the high-pressure shaft 22. As described above, one end of each of the shafts 16, 22, 40 may be coupled to a turbine (e.g., the low-pressure turbine 26, the high-pressure turbine 24, and the intermediate-pressure turbine, respectively) and the other end of each of the shafts 16, 22, 40 may be coupled to a compressor (e.g., the fan 14, a high-pressure compressor 18, and an intermediate-pressure compressor 18, respectively).

Referring back to FIG. 1, the turbine engine 12 further includes multiple speed sensors 30. Each of the speed sensors is positioned near an end of one of the shafts 16, 22 and is configured to measure the rotational speed of the corresponding shaft 16, 22. For example, as illustrated in FIG. 1, the low-pressure shaft 16 may include a speed sensor 30 positioned near the low-pressure turbine 26 and another speed sensor 30 positioned near the fan 14, and the high-pressure shaft 22 may include a speed sensor 30 positioned near the high-pressure turbine 24 and another speed sensor 30 positioned near the high-pressure compressor 18. Similarly, an intermediate-pressure shaft (not shown) may include a speed sensor 30 positioned near the intermediate-pressure turbine and another speed sensor 30 positioned near the intermediate-pressure compressor 18. Each speed sensor 30 may be embodied as any electronic, mechanical, or electromechanical sensor configured to measure the rotational speed of the corresponding shaft. For example, each speed sensors 30 may include one or more gears that mesh with the corresponding shaft and rotate at a speed proportional to the rotational speed of the shaft. Additionally or alternatively, the speed sensors 30 may include one or more Hall effect sensors, magnetic sensors, optical encoders, or other speed sensors. Each speed sensor 30 may output a sinusoidal analog signal with a frequency proportional to the rotational speed of the corresponding shaft.

The engine controller 32 controls the overall operation of the turbine engine 12 or various components of the turbine engine system 10 and may be embodied as any microcontroller, microprocessor, embedded system, or other computing device capable of performing the functions described herein. For example, the engine controller 32 may be embodied as a full-authority digital engine controller (FADEC). In addition to various other control operations, the engine controller 32 includes shaft twist monitoring logic 34. The shaft twist monitoring logic 34 may be embodied as hardware, firmware, software, or a combination thereof. For example, the shaft twist monitoring logic 34 may form a portion of, or otherwise be established by, a processor or other hardware components of the engine controller 32. As such, in some embodiments, the shaft twist monitoring logic 34 may be embodied as a circuit or collection of electrical devices (e.g., a shaft twist monitoring logic circuit). Additionally, in although illustrated as being included in the engine controller 32, it should be understood that in some embodiments the shaft twist monitoring logic 34 may be included in a separate controller, control unit, or other component, such as an engine health monitoring controller. As described further below, the shaft twist monitoring logic 34 is configured to measure rotational speeds of a shaft of the turbine engine 12, determine a shaft twist angle of the shaft as a function of the rotational speeds, determine whether the shaft twist angle is within a shaft health monitoring range, and record the shaft twist angle. As shown, the engine controller 32 may communicate with the turbine engine 12 using one or more engine control signals 36 and may communicate with the speed sensors 30 using one or more sensor data signals 38.

Figure 3:
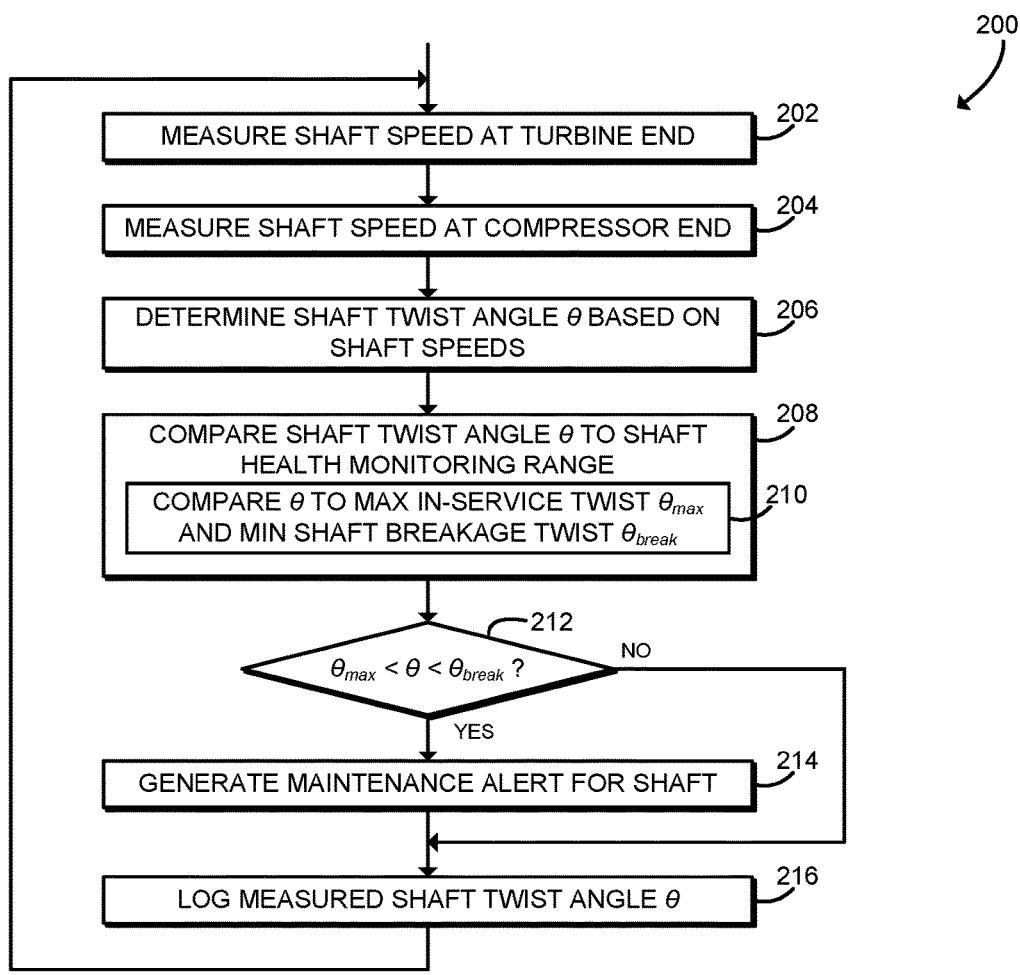
FIG. 3 is a simplified flow diagram of at least one embodiment of a method for engine health monitoring that may be executed by the turbine engine system of FIG. 1.

Referring now to FIG. 3, an illustrative method 200 that may be executed by the turbine engine system 10 (e.g., by the engine controller 32) is shown. Aspects of the method 200 may be embodied as electrical circuitry, computerized programs, routines, logic, and/or instructions, such as the shaft twist monitoring logic 34. The illustrative method 200 may be executed by the turbine engine system 10 in real time during normal operation of a turbine-engine-powered vehicle/system. Additionally or alternatively, in some embodiments, part of the method 200 (e.g., blocks 214, 216 described below) may also be executed in an offline environment (e.g., during propulsion system testing or aircraft maintenance). The turbine engine system 10 may execute a single instance of the method 200 or multiple instances of the method 200, for example by executing an instance of the method 200 for each shaft of the turbine engine 12.

The method 200 begins in block 202, in which the engine controller 32 measures the rotational speed of an engine shaft at the end of the shaft coupled to the corresponding turbine. For example, the engine controller 32 may measure the rotational speed of the low-pressure shaft 16 near the low-pressure turbine 26, the rotational speed of the high-pressure shaft 22 near the high-pressure turbine 24, or the rotational speed of the intermediate-pressure shaft 40 near an intermediate-pressure turbine. The engine controller 32 may measure the rotational speed by receiving a sensor data signal 38 from a speed sensor 30 positioned near the corresponding end of the shaft being measured.

Similarly, in block 204 the engine controller 32 measures the rotational speed of the engine shaft at the other end of the shaft, which is coupled to the corresponding compressor. For example, the engine controller 32 may measure the rotational speed of the low-pressure shaft 16 near the fan 14 (which may operate as a compressor), the rotational speed of the high-pressure shaft 22 near the high-pressure compressor 18, or the rotational speed of the intermediate-pressure shaft 40 near the intermediate-pressure compressor 18. The engine controller 32 may measure the rotational speed by receiving a sensor data signal 38 from a speed sensor 30 positioned near the corresponding end of the shaft being measured.

Additionally, although illustrated in blocks 202, 204 as measuring the rotational speeds of the shaft at ends coupled to a turbine and a compressor, respectively, it should be understood that in other embodiments the engine controller 32 may measure rotational speeds at either end of the shaft, regardless of the particular components coupled at the ends of the shafts.

In block 206, the engine controller 32 determines a shaft twist angle $\theta$ based on the measured shaft speeds at either end of the shaft. When the shaft is under load (e.g., when the turbine engine 12 is accelerating), the shaft may twist in response to the load. The shaft twist angle $\theta$ represents the angle of twist between either end of the shaft. In other words, the shaft twist angle θ corresponds to the angle between two fixed reference points on the surface of the shaft that, when the shaft is not flexed, are connected by a straight, longitudinal line. The engine controller 32 may determine the shaft twist angle θ by determining the phase angle between sinusoidal sensor data signals 38 received from the speed sensors 30 corresponding to either end of the shaft.

In block 208, the engine controller 32 compares the shaft twist angle θ to a shaft health monitoring range. In some embodiments, the engine controller 32 may compare the magnitude (i.e., absolute value) of the shaft twist angle θ to the shaft health monitoring range. The shaft health monitoring range is a range of twist angles that are not expected to occur in-service but do not indicate shaft breakage. Shaft twist values θ within the shaft health monitoring range may be most likely caused by a thermal event affecting the shaft (e.g., overheating). In block 210, the engine controller 32 compares the shaft twist angle θ to a maximum in-service twist angle $\theta_{max}$ and a minimum shaft breakage twist angle $\theta_{break}$. The maximum in-service twist angle $\theta_{max}$ is the design limit for shaft twist under normal (i.e., non-failed) operating conditions. The particular maximum in-service twist angle $\theta_{max}$ depends on attributes of the particular shaft being monitored. For example, a relatively long and flexible shaft such as the low-pressure shaft 16 may have a maximum in-service twist angle $\theta_{max}$ of about 20-25 degrees. As another example, a relatively short and stiff shaft such as the high-pressure shaft 22 may have a maximum in-service twist angle $\theta_{max}$ of about two to three degrees. The minimum shaft breakage twist angle $\theta_{break}$ is the minimum expected value for a shaft breakage event. In some embodiments, the minimum shaft breakage twist angle $\theta_{break}$ may also be used by an overspeed shutdown system of the turbine engine system 10 to shut down the turbine engine 12 in response to a shaft break event. The shaft health monitoring range includes angles between the maximum in-service twist angle $\theta_{max}$ and the minimum shaft breakage twist angle $\theta_{break}$.

In block 212, the engine controller 32 determines whether the shaft twist angle θ is greater than the maximum in-service twist angle $\theta_{max}$ and less than the minimum shaft breakage twist angle $\theta_{break}$. If not, the method 200 branches ahead to block 216, described below. If the shaft twist angle θ is greater than the maximum in-service twist angle $\theta_{max}$ and less than the minimum shaft breakage twist angle $\theta_{break}$, the method 200 advances to block 214. Of course, in other embodiments, the engine controller 32 may determine whether the shaft twist angle θ is greater than or equal to the maximum in-service twist angle $\theta_{max}$, determine whether the shaft twist angle θ is less than or equal to the minimum shaft breakage twist angle $\theta_{break}$, or compare the shaft twist angle θ to the maximum in-service twist angle $\theta_{max}$ and the minimum shaft breakage twist angle $\theta_{break}$ using any other appropriate predetermined relationship.

In block 214, the engine controller 32 generates a maintenance alert for the shaft. The maintenance alert indicates that the shaft twist angle θ was within the shaft health monitoring range. Therefore, the shaft may have experienced a thermal event and inspection of the shaft or other maintenance may be necessary. The engine controller 32 may use any technique to output the maintenance alert, such as displaying the alert, for example in a cockpit display, logging the alert for later reference, or otherwise indicating the alert.

In block 216, the engine controller 32 logs the measured shaft twist angle θ. The engine controller 32 may use any technique to log the shaft twist angle θ, for example by storing shaft twist angle θ data in a data storage device. The engine controller 32 may log, for example, the particular shaft twist angle θ that was measured and/or whether the measured angle is within the shaft health monitoring range. The logged shaft twist angle θ data may be used, for example, to verify that the shaft twist angle θ has not entered the shaft health monitoring range. As described above, the ability to verify that the shaft twist angle θ has not entered the shaft health monitoring range may allow the thermal environment of the shaft and the condition of the shaft to be verified without intrusive disassembly of the turbine engine 12 and inspection of the shaft. After logging the measured shaft twist angle θ, the method 200 loops back to block 202 to continue monitoring shaft twist.

Figure 4:
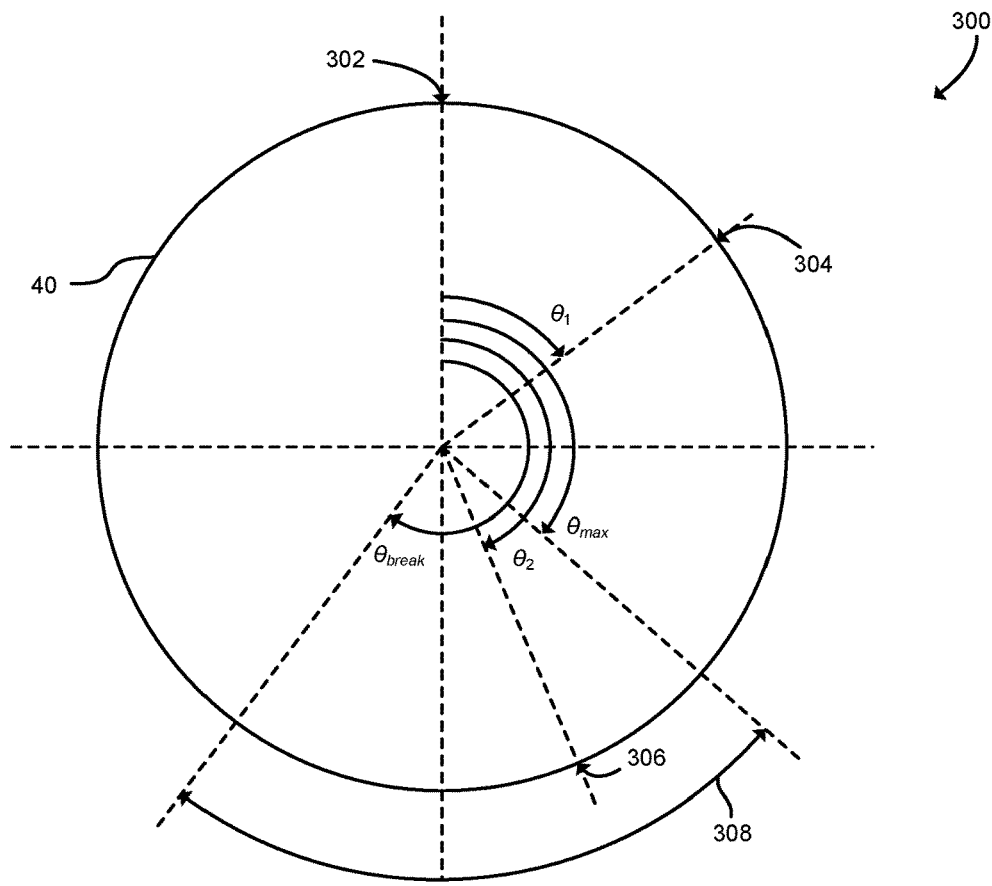
FIG. 4 is a diagram illustrating various shaft twist angles that may be measured by the turbine engine system of FIG. 1.

Referring now to FIG. 4, diagram 300 illustrates various shaft twist angles 6 that may be measured by the engine controller 32. The diagram 300 illustrates the intermediate-pressure shaft 40 from end-on. The diagram 300 illustrates the maximum in-service twist angle $\theta_{max}$ and the minimum shaft breakage twist angle $\theta_{break}$ as dashed lines. Note that the illustrated values of the maximum in-service twist angle $\theta_{max}$ and the minimum shaft breakage twist angle $\theta_{break}$ are exaggerated for clarity; as described above, in many embodiments those angles may be smaller than shown.

A reference point 302 on the intermediate-pressure shaft 40 is shown. The reference point 302 marks a fixed reference point on the intermediate-pressure shaft 40 at the end coupled to the intermediate compressor 18. When the intermediate-pressure shaft 40 is not twisted (i.e., the shaft twist angle θ is zero), the reference point 302 also marks another fixed reference point on the intermediate-pressure shaft 40 at the end coupled to the intermediate turbine. When the intermediate-pressure shaft 40 is not twisted, a straight, longitudinal line passes through both reference points. A reference point 304 represents the fixed reference point on the intermediate-pressure shaft 40 at the end coupled to the intermediate turbine when the intermediate-pressure shaft 40 is twisted by the shaft twist angle $\theta_1$. As shown, the shaft twist angle $\theta_1$ is less than the maximum in-service twist angle $\theta_{max}$ and thus may represent the intermediate-pressure shaft 40 during normal operation.

A reference point 306 represents the fixed reference point on the intermediate-pressure shaft 40 at the end coupled to the intermediate turbine when the intermediate-pressure shaft 40 is twisted by the shaft twist angle $\theta_2$. As shown, the shaft twist angle $\theta_2$ is greater than the maximum in-service twist angle $\theta_{max}$ and less than the minimum shaft breakage twist angle $\theta_{break}$. Therefore, shaft twist angle $\theta_2$ falls within a shaft health monitoring range 308. Thus, the shaft twist angle $\theta_2$ may represent the intermediate-pressure shaft 40 during abnormal operation, for example during a thermal event.

The diagram 300 illustrates the shaft twist angles 6, the maximum in-service twist angle $\theta_{max}$, and the minimum shaft breakage twist angle $\theta_{break}$ as increasing in magnitude in a clockwise direction from the zero-load reference point 302. It should be understood that in certain situations, a shaft may also twist in the counter-clockwise direction, for example when ringing around the zero-load reference point 302. As described above in connection with block 208 of FIG. 3, to account for potentially negative values for the shaft twist angle θ, the absolute value of the shaft twist angle θ may be compared to the maximum in-service twist angle $\theta_{max}$ and the minimum shaft breakage twist angle $\theta_{break}$.

Figure 5:
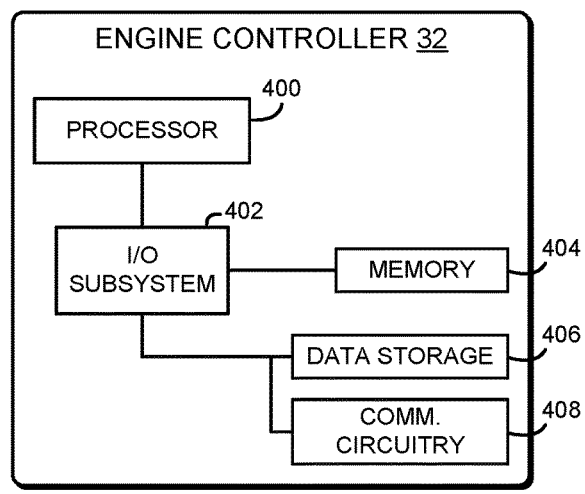
FIG. 5 is a simplified block diagram of at least one embodiment of a controller of the turbine engine system of FIG. 1.

Referring now to FIG. 5, an embodiment of the engine controller 32 is shown. The illustrative engine controller 32 is embodied as one or more computing devices, which may include one or more controllers or processors (e.g., microcontrollers, microprocessors, digital signal processors, field-programmable gate arrays (FPGAs), programmable logic arrays (PLAs), etc.), and/or other electrical circuitry. The engine controller 32 includes hardware, firmware, and/or software components that are capable of performing the functions disclosed herein, including the functions of the shaft twist monitoring logic 34. The engine controller 32 may be in communication with one or more other devices (such as one or more embedded controllers) by one or more communication networks (not shown), in order to perform one or more of the disclosed functions. Additionally, although illustrated as a single component, it should be understood that in some embodiments the functions of the engine controller 32 may be distributed in multiple components through the turbine engine system 10.

The illustrative engine controller 32 includes at least one processor 400, an input/output (I/O) subsystem 402, and a memory 404. The I/O subsystem 402 typically includes, among other things, an I/O controller, a memory controller, and one or more I/O ports, although not specifically shown. The processor 400 and the I/O subsystem 402 are communicatively coupled to the memory 404. The memory 404 may be embodied as any type of suitable computer memory device (e.g., volatile memory such as various forms of random access memory). The I/O subsystem 402 is communicatively coupled to a number of hardware and/or software components, including a data storage device 406 and communication circuitry 408.

The data storage device 406 may include one or more hard drives or other suitable persistent data storage devices (e.g., flash memory, memory cards, memory sticks, read-only memory devices, and/or others). Information about the different operating conditions of the turbine engine system 10, logged maintenance alerts, logged shaft twist angle data, and/or any other data needed by the turbine engine system 10 (e.g., the shaft twist monitoring logic 34) may be stored by the data storage device 406. Portions of the shaft twist monitoring logic 34 may be copied to the memory 404 during operation of the turbine engine system 10, for faster processing or other reasons. The shaft twist monitoring logic 34 may be embodied as one or more computer-executable components and/or data structures (e.g., computer hardware, firmware, software, or a combination thereof). Particular aspects of the methods that may be performed by the shaft twist monitoring logic 34 may vary depending on the requirements of a particular design of the turbine engine system 10. Accordingly, the examples described herein are illustrative and intended to be non-limiting.

The communication circuitry 408 may communicatively couple the engine controller 32 to one or more other devices, systems, or communication networks, e.g., a vehicle area network, controller area network, local area network, and/or wide area network, for example. Accordingly, the communication circuitry 408 may include one or more wired or wireless network interface software, firmware, or hardware, for example, as may be needed pursuant to the specifications and/or design of the particular turbine engine system 10. Further, the engine controller 32 may include other components, sub-components, and devices not illustrated herein for clarity of the description. In general, the components of the engine controller 32 are communicatively coupled as shown in FIG. 5 by electronic signal paths, which may be embodied as any type of wired or wireless signal paths capable of facilitating communication between the respective devices and components.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A controller for gas turbine engine health monitoring, the controller comprising shaft twist monitoring logic configured to:

measure a first rotational speed of a shaft of a gas turbine engine at a first end of the shaft, wherein the first end of the shaft is coupled to a turbine of the gas turbine engine;

measure a second rotational speed of the shaft at a second end of the shaft, wherein the second end of the shaft is coupled to a compressor of the gas turbine engine;

determine a shaft twist angle of the shaft as a function of the first rotational speed and the second rotational speed;

determine whether the shaft twist angle is within a predetermined shaft health monitoring range, wherein to determine whether the shaft twist angle is within the shaft health monitoring range comprises to (i) determine whether the shaft twist angle has a first predetermined relationship to a predetermined maximum in-service twist angle and (ii) determine whether the shaft twist angle has a second predetermined relationship to a predetermined minimum shaft breakage twist angle; and record the shaft twist angle in response to a determination of whether the shaft twist angle is within the predetermined shaft health monitoring range.

2. The controller of claim 1, wherein the shaft twist monitoring logic is further configured to generate a maintenance alert in response to a determination that the shaft twist angle is within the predetermined shaft health monitoring range.

3. The controller of claim 1, wherein the first predetermined relationship comprises is greater than and the second predetermined relationship comprises is less than.

4. The controller of claim 1, wherein:
to measure the first rotational speed comprises to receive a first speed signal from a first speed sensor of the gas turbine engine; and
to measure the second rotational speed comprises to receive a second speed signal from a second speed sensor of the gas turbine engine.

5. The controller of claim 4, wherein to determine the shaft twist angle comprises to determine a phase difference between the first speed signal and the second speed signal.

6. The controller of claim 1, wherein the gas turbine engine comprises a multi-shaft turbine engine and the shaft is concentrically positioned within a second shaft.

7. A method for gas turbine engine health monitoring, the method comprising:
measuring, by a controller of a gas turbine engine, a first rotational speed of a shaft of the gas turbine engine at a first end of the shaft, wherein the first end of the shaft is coupled to a turbine of the gas turbine engine;
measuring, by the controller, a second rotational speed of the shaft at a second end of the shaft, wherein the second end of the shaft is coupled to a compressor of the gas turbine engine;
determining, by the controller, a shaft twist angle of the shaft as a function of the first rotational speed and the second rotational speed;
determining, by the controller, whether the shaft twist angle is within a predetermined shaft health monitoring range, wherein determining whether the shaft twist angle is within the shaft health monitoring range comprises (i) determining whether the shaft twist angle has a first predetermined relationship to a predetermined maximum in-service twist angle and (ii) determining whether the shaft twist angle has a second predetermined relationship to a predetermined minimum shaft breakage twist angle; and recording, by the controller, the shaft twist angle in response to determining whether the shaft twist angle is within the predetermined shaft health monitoring range.

8. The method of claim 7, further comprising generating, by the controller, a maintenance alert in response to determining that the shaft twist angle is within the predetermined shaft health monitoring range.

9. The method of claim 7, wherein:
determining whether the shaft twist angle has the first predetermined relationship to the predetermined maximum in-service twist angle comprises determining whether the shaft twist angle is greater than the maximum in-service twist angle; and
determining whether the shaft twist angle has the second predetermined relationship to the predetermined minimum shaft breakage twist angle comprises determining whether the shaft twist angle is less than the minimum shaft breakage twist angle.

10. The method of claim 7, wherein:
measuring the first rotational speed comprises receiving a first speed signal from a first speed sensor of the gas turbine engine; and
measuring the second rotational speed comprises receiving a second speed signal from a second speed sensor of the gas turbine engine.

11. The method of claim 10, wherein determining the shaft twist angle comprises determining a phase difference between the first speed signal and the second speed signal.

12. One or more non-transitory, computer-readable storage media comprising a plurality of instructions that in response to being executed cause a controller of a gas turbine engine to:
measure a first rotational speed of a shaft of the gas turbine engine at a first end of the shaft, wherein the first end of the shaft is coupled to a turbine of the gas turbine engine;
measure a second rotational speed of the shaft at a second end of the shaft, wherein the second end of the shaft is coupled to a compressor of the gas turbine engine;
determine a shaft twist angle of the shaft as a function of the first rotational speed and the second rotational speed;
determine whether the shaft twist angle is within a predetermined shaft health monitoring range, wherein to determine whether the shaft twist angle is within the shaft health monitoring range comprises to (i) determine whether the shaft twist angle has a first predetermined relationship to a predetermined maximum in-service twist angle and (ii) determine whether the shaft twist angle has a second predetermined relationship to a predetermined minimum shaft breakage twist angle; and
record the shaft twist angle in response to determining whether the shaft twist angle is within the predetermined shaft health monitoring range.

13. The one or more non-transitory, computer-readable storage media of claim 12, further comprising a plurality of instructions that in response to being executed cause the controller to generate a maintenance alert in response to determining that the shaft twist angle is within the predetermined shaft health monitoring range.

14. The one or more non-transitory, computer-readable storage media of claim 12, wherein:
to determine whether the shaft twist angle has the first predetermined relationship to the predetermined maximum in-service twist angle comprises to determine whether the shaft twist angle is greater than the maximum in-service twist angle; and to determine whether the shaft twist angle has the second predetermined relationship to the predetermined minimum shaft breakage twist angle comprises to determine whether the shaft twist angle is less than the minimum shaft breakage twist angle.

15. The one or more non-transitory, computer-readable storage media of claim 12, wherein:

to measure the first rotational speed comprises to receive a first speed signal from a first speed sensor of the gas turbine engine; and to measure the second rotational speed comprises to receive a second speed signal from a second speed sensor of the gas turbine engine.

16. The one or more non-transitory, computer-readable storage media of claim 15, wherein to determine the shaft twist angle comprises to determine a phase difference between the first speed signal and the second speed signal.

17. The one or more non-transitory, computer-readable storage media of claim 12, wherein the gas turbine engine comprises a multi-shaft turbine engine and the shaft is concentrically positioned within a second shaft.

* * * * *